United States Patent [19]
Miller

[11] Patent Number: 5,890,555
[45] Date of Patent: Apr. 6, 1999

[54] ELECTRIC VEHICLE

[76] Inventor: George W. Miller, P.O. Box 3114, East Orange, N.J. 07019

[21] Appl. No.: 9,025

[22] Filed: Jan. 20, 1998

[51] Int. Cl.$^6$ .................................................. B60K 1/00
[52] U.S. Cl. ............................................. 180/65.7; 477/9
[58] Field of Search .............................. 180/65.7, 65.1, 180/65.2, 65.6, 235; 303/3; 318/139, 142, 143; 477/9, 14, 15

[56] References Cited

U.S. PATENT DOCUMENTS

| | | | |
|---|---|---|---|
| 4,082,988 | 4/1978 | Reime et al. .............................. | 318/139 |
| 4,662,472 | 5/1987 | Christianson et al. ................... | 180/235 |
| 5,139,121 | 8/1992 | Kumura et al. .......................... | 192/1.43 |
| 5,172,784 | 12/1992 | Varela, Jr. ................................ | 180/65.4 |
| 5,343,970 | 9/1994 | Severinsky .............................. | 180/65.2 |
| 5,396,968 | 3/1995 | Hasebe et al. ........................... | 180/65.6 |
| 5,583,406 | 12/1996 | Mutoh et al. ............................ | 318/376 |
| 5,685,798 | 11/1997 | Lutz et al. ............................... | 180/65.6 |
| 5,714,856 | 2/1998 | Young ..................................... | 318/376 |
| 5,734,238 | 3/1998 | Yanagisawa et al. .................... | 318/139 |

Primary Examiner—Richard M. Camby
Attorney, Agent, or Firm—Richard L. Miller, P.E

[57] ABSTRACT

An electric vehicle that includes a drive train system that propel the electric vehicle, an electrical system that powers the drive train system, and a steering system that steers the electric vehicle. The electrical system includes a battery charger that is at least one of an off board A.C. charger in which the battery pack is selectively plugged into a socket in the off board A.C. charger by a plug, and wheel generators in which the battery pack is in selective electrical communication therewith by a brake switch that is operatively connected to a brake system so as to only activate the battery charger when the brake system is applied. The wheel generators that are operatively connected to the rear wheels comprise stator portions that are fixedly mounted in the axle housing and rotor portions that are fixedly mounted on for rotation with the drive axle and which are in electrical communication with the associated stator portions. The wheel generators that are operatively connected to the front wheels comprise stator portions that are fixedly mounted on the spindles and rotor portions that are fixedly mounted in for rotation with the front wheels and which are in electrical communication with the associated stator portions.

9 Claims, 3 Drawing Sheets

ELECTRIC VEHICLE

BACKGROUND OF THE INVENTION

1. Field of the Invention

The present invention relates to a vehicle. More particularly, the present invention relates to an electric vehicle.

2. Description of the Prior Art

Numerous innovations for electric vehicles have been provided in the prior art that will be described. Even though these innovations may be suitable for the specific individual purposes to which they address, however, they differ from the present invention.

FOR EXAMPLE, U.S. Pat. No. 4,082,988 to Reime et al. teaches a battery operated electric power plant for motor driven vehicles powered by rechargeable electric storage batteries and one or more dynamo-electric devices capable of operation both as a motor for driving the vehicle and as a generator for recharging the batteries. Electronic switching circuitry cyclically alternates operation of the dynamo-electric devices in a motor phase and generator phase during each cycle and varies the relative duration of the motor phase and generator phase during each cycle according to the power demand on the electric motor.

ANOTHER EXAMPLE, U.S. Pat. No. 5,139,121 to Kumura et al. teaches a braking system for a vehicle having a propelling electric motor and an electromagnetic brake. The system includes a friction brake; a manually operable brake control lever; an interlocking device for transmitting a displacement of the brake control lever to operate the friction brake; a detecting device a for detecting the displacement of the brake control lever and outputting a displacement detection signal; and a control device connected to the electric motor. The electromagnetic brake and the detecting device controls the electric motor and the electromagnetic brake and receives the displacement detection signal from the detecting device. The control device is a board computer operable to reduce rotating rate of the electric motor and actuate the electromagnetic brake to exert a braking force below a maximum braking force during a predetermined period following receipt of the displacement detection signal, and upon lapse of the predetermined period to stop the electric motor and actuate the electromagnetic brake to exert the maximum braking force. When the brake control lever is operated to stop the running vehicle, the running speed is gradually lowered over the predetermined time following an operation of the brake control lever. Consequently, shocks due to stopping of the vehicle are suppressed. The electric motor receives no power supply and the brake is set to a maximum braking state after lapse of the predetermined time. The vehicle is positively stopped by a combined effect of elimination of the propelling drive and the maximum braking force.

STILL ANOTHER EXAMPLE, U.S. Pat. No. 5,343,970 to Severinsky teaches an improved hybrid electric vehicle that includes an internal combustion engine and an electric motor. Both the motor and the engine provide torque to drive the vehicle directly through a controllable torque transfer unit. Typically, at low speeds or in traffic, the electric motor alone drives the vehicle, using power stored in batteries; under acceleration and during hill climbing both the engine and the motor provide torque to drive the vehicle; and in steady state highway cruising, the internal combustion engine alone drives the vehicle. The internal combustion engine is sized to operate at or near its maximum fuel efficiency during highway cruising. The motor is operable as a generator to charge the batteries as needed and also for regenerative braking. No transmission is employed. The motor operates at significantly lower currents and higher voltages than conventionally and has a rated power at least equal to that of the internal combustion engine. In this matter a cost efficient vehicle is provided, suffering no performance disadvantage compared to conventional vehicles.

FINALLY, YET ANOTHER EXAMPLE, U.S. Pat. No. 5,396,968 to Hasebe et al. teaches a drive mechanism for an electric car which has a plurality of motors arranged in a drive mechanism case which, in turn rotatably supports a shaft at two points. This shaft transmits the rotation generated by the motors to drive shafts for rotation of the wheels to run the car. The motors are composed of stators having armature cores and coils, and rotors. The stators are fixed in the drive mechanism case and the rotors are supported by the shaft. Since this shaft is rotatably supported at two points by the drive mechanism case, accurate centering of the rotor is maintained.

It is apparent that numerous innovations for electric vehicles have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an electric vehicle that avoids the disadvantages of the prior art.

ANOTHER OBJECT of the present invention is to provide an electric vehicle that is simple and inexpensive to manufacture.

STILL ANOTHER OBJECT of the present invention is to provide an electric vehicle that is simple to use.

BRIEFLY STATED, YET ANOTHER OBJECT of the present invention is to provide an electric vehicle that includes a drive train system that propel the electric vehicle, an electrical system that powers the drive train system, and a steering system that steers the electric vehicle. The electrical system includes a battery charger that is at least one of an off board A.C. charger in which the battery pack is selectively plugged into a socket in the off board A.C. charger by a plug, and wheel generators in which the battery pack is in selective electrical communication therewith by a brake switch that is operatively connected to a brake system so as to only activate the battery charger when the brake system is applied. The wheel generators that are operatively connected to the rear wheels comprise stator portions that are fixedly mounted in the axle housing and rotor portions that are fixedly mounted on for rotation with the drive axle and which are in electrical communication with the associated stator portions. The wheel generators that are operatively connected to the front wheels comprise stator portions that are fixedly mounted on the spindles and rotor portions that are fixedly mounted in for rotation with the front wheels and which are in electrical communication with the associated stator portions.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

Figure 1:
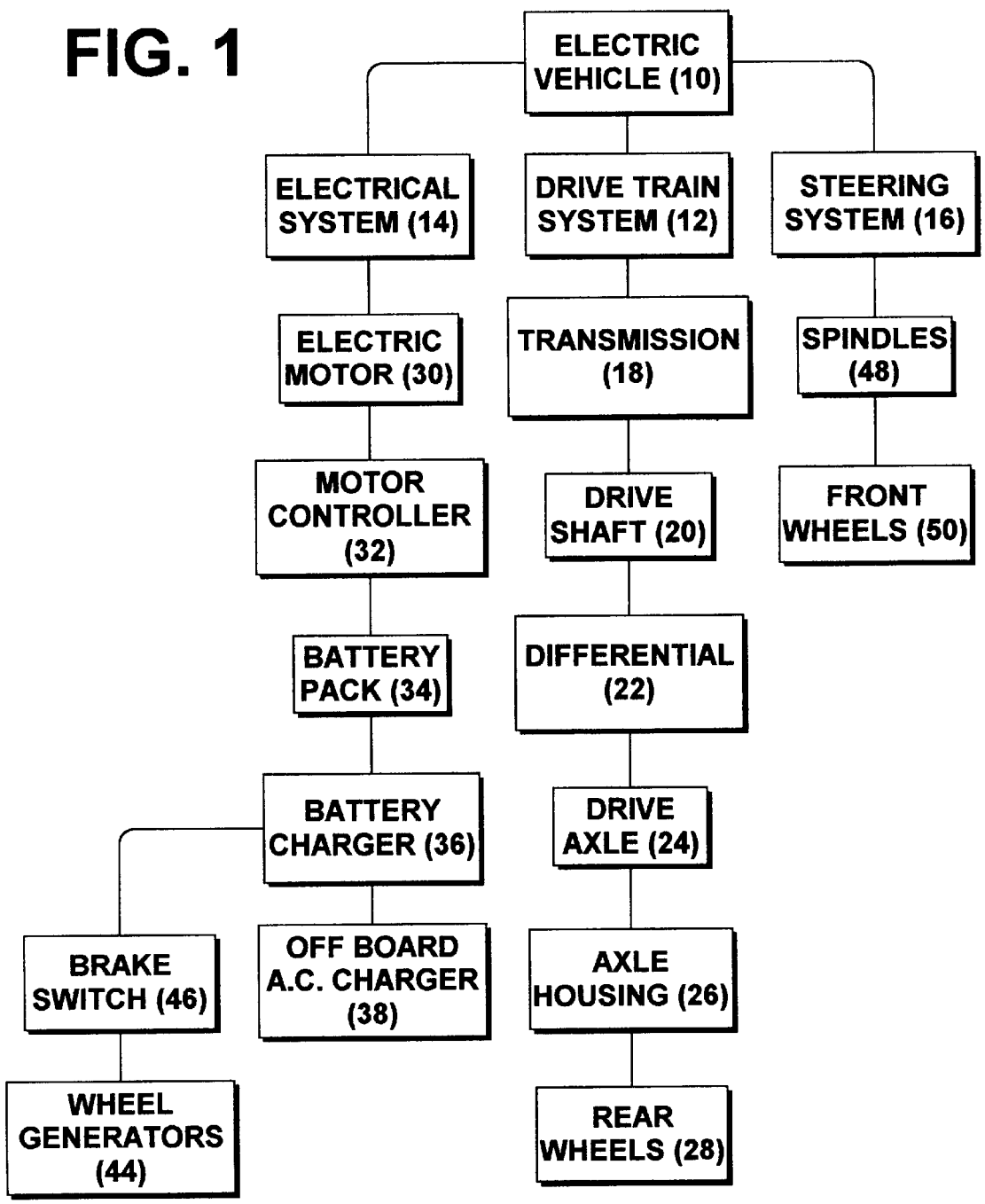
FIG. 1 is a block diagram of the present invention.

LIST OF REFERENCE NUMERALS UTILIZED IN THE DRAWING 10 electric vehicle of the present invention
12 drive train system propelling electric vehicle 10
14 electrical system powering drive train system 12 propelling electric vehicle 10
16 steering system steering electric vehicle 10
18 transmission of drive train system 12
20 drive shaft operatively connected to transmission 18 of drive train system 12
22 differential operatively connected to drive shaft 20 of drive train system 12
24 drive axle operatively connected to differential 22 of drive train system 12
26 axle housing rotatively housing drive axle 24 of drive train system 12
28 rear wheels operatively connected to drive axle 24 of drive train system 12
30 electric motor 30 of electrical system 14 operatively connected to transmission 18 of drive train system 12
32 motor controller of electrical system 14 in electrical communication with electric motor 30 of electrical system 14
34 battery pack of electrical system 14 in electrical communication with electric motor 30 of electrical system 14
36 battery charger of electrical system 14 in electrical communication with battery pack 34 of electrical system 14
38 off board A.C. charger of battery charger 36 of electrical system 14
40 socket in off board A.C. charger 38 of battery charger 36 of electrical system 14
42 plug of battery pack 34 of electrical system 14
44 wheel generators of battery charger 36 of electrical system 14
46 brake switch of wheel generators 44 of battery charger 36 of electrical system 14
48 spindles of steering system 16
50 front wheels 50 rotatively mounted to spindles 48 of steering system 16
52 stator portions of wheel generators 44 of electrical system 14 fixedly mounted in axle housing 26 of drive train system 12
54 rotor portions of wheel generators 44 of electrical system 14 fixedly mounted on for rotation with drive axle 24 of drive train system 12 and in electrical communication with stator portions 52 of wheel generators 44 of electrical system 14
56 stator portions of wheel generators 44 of electrical system 14 fixedly mounted on spindles 48 of steering system 16
58 rotor portions of wheel generators 44 of electrical system 14 fixedly mounted in for rotation with front wheels 50 of steering system 16 and in electrical communication with stator portions 56 of wheel generators 44 of electrical system 14

DETAILED DESCRIPTION OF THE PREFERRED EMBODIMENT

Figure 2:
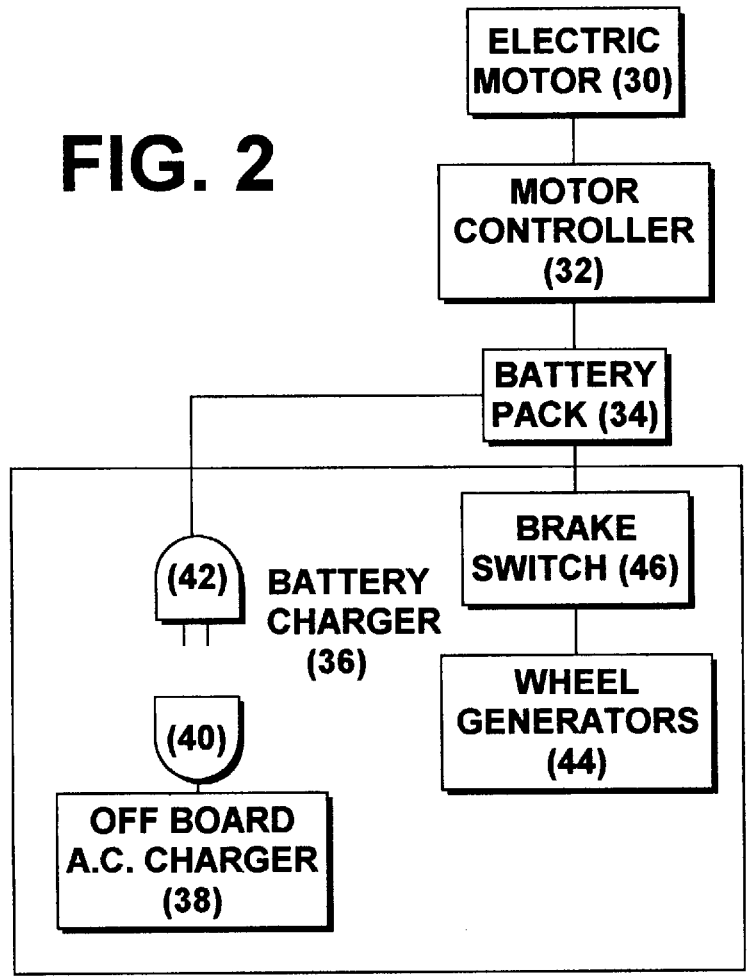
FIG. 2 is a block diagram of the electrical system of the present invention.
Figure 3:
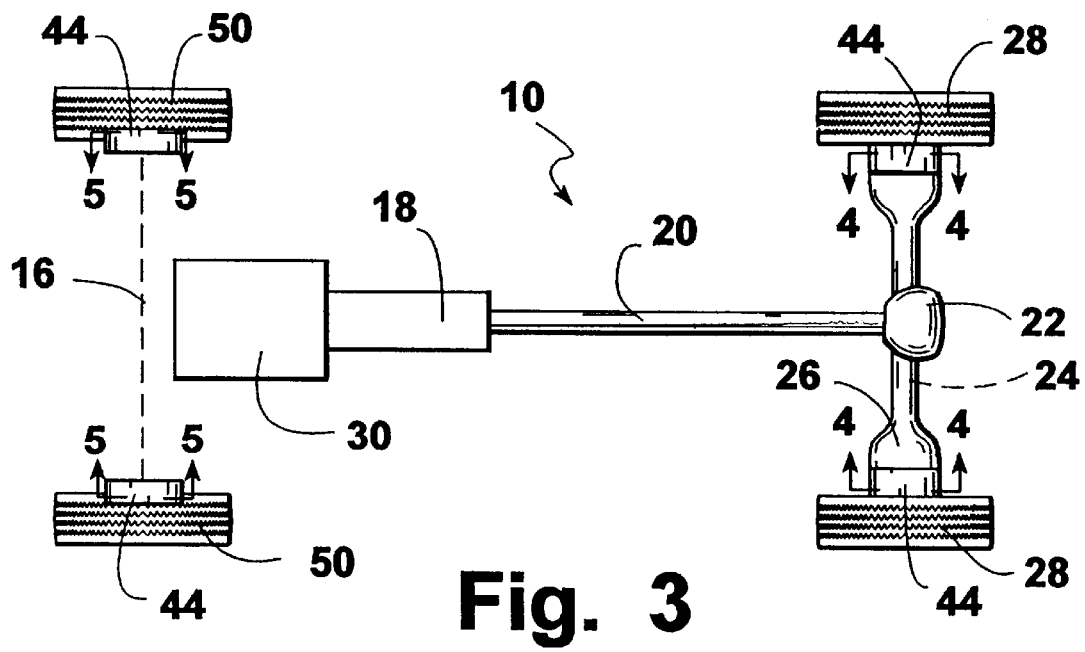
FIG. 3 is a diagrammatic top plan view of the present invention.

Referring now to the figures in which like numerals indicate like parts, and particularly to FIGS. 1–3, the electric vehicle of the present invention is shown generally at 10 and comprises a drive train system 12 that propels the electric vehicle 10, an electrical system 14 that powers the drive train system 12, and a steering system 16 that steers the electric vehicle 10.

The drive train system 12 supplies the engine's power to driving the wheels and tires with the least loss (or highest efficiency). In general, the drive train system 12:

1. Converts the torque and the speed of the engine to vehicle motion—traction;
2. Changes directions—enables forward and backward vehicle motion;
3. Permits different rotational speeds of the drive wheels when corning—differential;
4. Overcomes hills and grades; and
5. Maximizes fuel economy.

The drive train system 12 comprises a transmission 18 that provides a number of alternative gear ratios to the engine so that the vehicle can achieve maximum torque for hill-climbing and minimum speed for economical cruising.

The drive train system 12 further comprises a drive shaft 20 that is operatively connected to the transmission 18 of the drive train system 12 for rotation therewith and connects the drive wheels to the transmission 18 of the drive train system 12 in rear-wheel-drive vehicles, and which is not needed in front-wheel-drive vehicles.

The drive train system 12 further comprises a differential 22 that is operatively connected to the drive shaft 20 of the drive train system 12 and accommodates the fact that outer wheels must cover a greater distance than inner wheels when a vehicle is cornering, and translates force 90 degrees in rear-wheel-drive vehicles, and depending upon how the engine is mounted, may or may not be required in front-wheel-drive vehicles.

The drive train system 12 further comprises a drive axle 24 that is operatively connected to the differential 22 of the drive train system 12 and transfers power from the differential 22 of the drive train system 12 to the drive wheels.

The drive train system 12 further comprises an axle housing 26 that rotatively houses the drive axle 24 of the drive train system 12 therein, and rear wheels 28 that are operatively connected to the drive axle 24 of the drive train system 12 for rotation therewith.

The electrical system 14 comprises an electric motor 30 that is operatively connected to the transmission 18 of the drive train system 12 and provides the raw power or torque to propel the vehicle. The electric motor 30 of the electrical system 14 is preferably a series D.C. motor, an example of which is model FB1-4001, sold by ADVANCE D.C. MOTORS, INC. of Syracuse, N.Y.

The electrical system 14 further comprises a motor controller 32 that is in electrical communication with the electric motor 30 of the electrical system 14, and is preferably of the pulse width modulation variety (PWM), an example of which is model 1221B-7401, sold by CURTIS PWM, a division of CURTIS INSTRUMENTS, INC., of Mt. Kisco, N.Y., and which matches the impedance of the model FB1-4001 series D.C. motor discussed supra.

The electrical system 14 further comprises a battery pack 34 that is in electrical communication with the electric motor 30 of the electrical system 14, and is preferably a collection of 12 to 24 6-volt (or 12-volt equivalent) lead-acid batteries of the deep-discharge variety, examples of which are models T-125 and 27TMH, sold by the TROJAN BATTERY COMPANY of Santa Fe Springs, Calif.

The electrical system 14 further comprises a battery charger 36 that is in electrical communication with the battery pack 34 of the electrical system 14 for recharging the battery pack 34 of the electrical system 14.

The battery charger 36 of the electrical system 14 is at least one of an off board A.C. charger 38 in which the battery pack 34 of the electrical system 14 is selectively plugged into a socket 40 in the off board A.C. charger 38 of the electrical system 14 by a plug 42, an example of which is preferably model 9387 sold by LESTER, and wheel generators 44, a detailed discussion of which will be presented further infra, in which the battery pack 34 of the electrical system 14 is in selective electrical communication therewith by a brake switch 46 that is operatively connected to the brake system of the electric vehicle 10 so as to only activate the battery charger 36 of the electrical system 14 when the brakes are applied so as to prevent the creation of electromagnetic braking forces when the vehicle is not desired to have braking.

The steering system 16 comprises spindles 48, and front wheels 50 that are rotatively mounted to the spindles 48 of the steering system 16.

Figure 4:
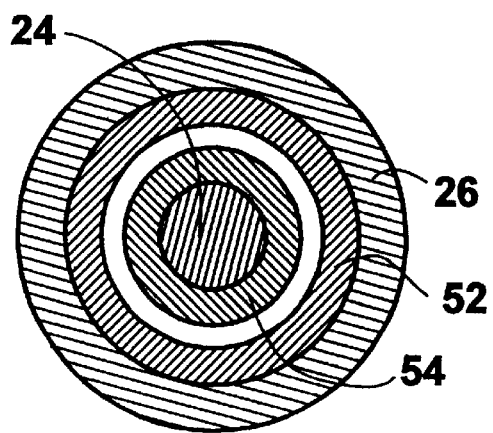
FIG. 4 is an enlarged cross sectional view taken on line 4—4 in FIG. 3.
Figure 5:
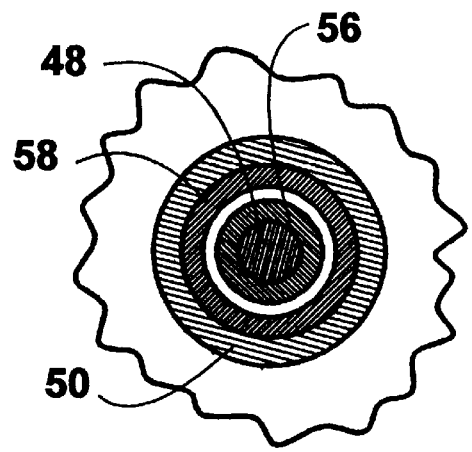
FIG. 5 is an enlarged cross sectional view taken on line 5—5 in FIG. 3.

The configuration of the wheel generators 44 of the electrical system 14 can best be seen in FIGS. 3–5, and as such will be discussed with reference thereto.

The wheel generators 44 of the electrical system 14 that are operatively connected to the rear wheels 28 of the drive train system 12 comprise stator portions 52 that are preferably fixedly mounted in the axle housing 26 of the drive train system 12 or to any stationary part of the rear, and rotor portions 54 that are preferably fixedly mounted on for rotation with the drive axle 24 of the drive train system 12 or to any rotating portion of the rear which allows it to be in electrical communication with the associated stator portions 52 of the wheel generators 44 of the electrical system 14.

The wheel generators 44 of the electrical system 14 that are operatively connected to the front wheels 50 of the steering system 16 comprise stator portions 56 that are fixedly mounted on the spindles 48 of the steering system 16 or to any stationary part of the front, and rotor portions 58 that are fixedly mounted in for rotation with the front wheels 50 of the steering system 16 or to any portion of the front that allows it to be in electrical communication with the associated stator portions 56 of the wheel generators 44 of the electrical system 14.

It will be understood that each of the elements described above, or two or more together, may also find a useful application in other types of constructions differing from the types described above.

While the invention has been illustrated and described as embodied in an electric vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An electric vehicle, comprising:
a) a drive train system propelling said electric vehicle;
b) an electrical system powering said drive train system; and
c) a steering system steering said electric vehicle, wherein said drive train system comprises a transmission that provides a number of alternative gear ratios so as to allow said vehicle to achieve maximum torque for hill-climbing and minimum speed for economical cruising, wherein said drive train system further comprises a drive shaft that is operatively connected to said transmission of said drive train system for rotation therewith, wherein said drive train system further comprises a differential that is operatively connected to said drive shaft of said drive train system, wherein said drive train system further comprises a drive axle that is operatively connected to said differential of said drive train system, wherein said drive train system further comprises an axle housing that rotatively houses said drive axle of said drive train system therein, and rear wheels that are operatively connected to said drive axle of said drive train system for rotation therewith, wherein said electrical system comprises an electric motor that is operatively connected to said transmission of said drive train system, and which has an impedance, wherein said electrical system further comprises a battery pack that is in electrical communication with said electric motor of said electrical system, wherein said battery charger of said electrical system is at least one of an off board A.C. charger in which said battery pack of said electrical system is selectively plugged into a socket in said off board A.C. charger of said electrical system by a plug, and wheel generators in which said battery pack of said electrical system is in selective electrical communication therewith by a brake switch that is operatively connected to a brake system of said electric vehicle so as to only activate said battery charger of said electrical system when said brake system is applied so as to prevent the creation of electromagnetic braking forces when the vehicle is not desired to have braking.

2. The vehicle as defined in claim 1, wherein said electric motor of said electrical system is a series D.C. motor.

3. The vehicle as defined in claim 1, wherein said electrical system further comprises a motor controller that is in electrical communication with said electric motor of said electrical system.

4. The vehicle as defined in claim 1, wherein said motor controller of said electrical system is of a pulse width modulation variety which matches said impedance of said electric motor of said electrical system.

5. The vehicle as defined in claim 1, wherein said battery pack of said electrical system is a collection of 12 to 24 lead-acid batteries of deep-discharge variety.

6. The vehicle as defined in claim 1, wherein said electrical system further comprises a battery charger that is in electrical communication with said battery pack of said electrical system for recharging said battery pack of said electrical system.

7. The vehicle as defined in claim 1, wherein said steering system comprises spindles, and front wheels that are rotatively mounted to said spindles of said steering system.

8. The vehicle as defined in claim 1, wherein said wheel generators of said electrical system that are operatively connected to said rear wheels of said drive train system comprise stator portions that are fixedly mounted in said axle housing of said drive train system, and rotor portions that are fixedly mounted on for rotation with said drive axle of said drive train system, and which are in electrical communication with associated said stator portions of said wheel generators of said electrical system.

9. The vehicle as defined in claim 7, wherein said wheel generators of said electrical system that are operatively connected to said front wheels of said steering system comprise stator portions that are fixedly mounted on said spindles of said steering system, and rotor portions that are fixedly mounted in, for rotation with, said front wheels said steering system, and which are in electrical communication with associated said stator portions of said wheel generators of said electrical system.

* * * * *